US006985838B1

(12) United States Patent
Jarchow

(10) Patent No.: US 6,985,838 B1
(45) Date of Patent: *Jan. 10, 2006

(54) SYSTEM FOR ESTIMATING THICKNESS OF THIN SUBSURFACE STRATA

(75) Inventor: Craig M. Jarchow, Katy, TX (US)

(73) Assignee: Apache Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/498,012

(22) Filed: Feb. 4, 2000

(51) Int. Cl.
G06G 7/48 (2006.01)
(52) U.S. Cl. .................. 703/5; 703/1; 703/2; 703/6; 703/10; 702/16
(58) Field of Classification Search .................. 703/1, 703/2, 5, 6, 10; 702/16
See application file for complete search history.

(56) References Cited

U.S. PATENT DOCUMENTS

| | | | | |
|---|---|---|---|---|
| 4,530,076 | A | * | 7/1985 | Dwyer ........................ 367/135 |
| 4,633,447 | A | | 12/1986 | Bodine |
| 4,665,390 | A | * | 5/1987 | Kern et al. .................. 340/587 |
| 5,870,691 | A | | 2/1999 | Partyka et al. |
| 6,131,071 | A | * | 10/2000 | Partyka et al. ................. 702/16 |
| 6,278,949 | B1 | * | 8/2001 | Alam ........................... 702/16 |

OTHER PUBLICATIONS

Marple Jr., "Frequency Resolution of Fourier and Maximum Entropy Spectral Estimates", Geophysics, vol. 47, No. 9, Sep. 1982, pp. 1303-1307.*

Cox et al., "Maximum Entropy Analysis of Dispersed Seismic Signals", Geophysics, vol. 51, No. 12, Dec. 1986, pp. 2225-2234.*

R.S. Kallweit and L.C. Wood; The limits of resolution of zero-phase wavelets; Geophysics; Jul. 1982; p. 1035-1046; vol. 47; No. 7.

John A. Lopez, Greg Partyka, Norm L. Haskell, and Susan E. Nissen; Identification of Deltaic Facies with 3-D Seismic Coherency and the Spectral Decomposition Cube: A Study From South Marsh Island Area, Gulf of Mexico; Houston Geological Society; Jan. 1998; p. 14-15; vol. 40; No. 5.

James Gridley and Greg Partyka; Processing and interpretational aspects of spectral decomposition: Annual Meeting Abstracts; Society of Exploration Geophysicists; 1997; p. 1055-1058.

William H. Press, Saul A. Teukolsky, William T. Vetterling, and Brian P. Flannery; Numerical Recipes in C: Second Edition; 1992; p. 568-569; Cambridge University Press; Cambridge England.

William H. Press, Saul A. Teukolsky, William T. Vetterling, and Brian P. Flannery; Numerical Recipes in C: Second Edition; 1992; p. 575; Cambridge University Press; Cambridge England.

M.B. Widess; How Thin Is A Thin Bed?; Geophysics; Dec. 1973; p. 1176-1180; vol. 38; No. 6.

(Continued)

Primary Examiner—Jean R. Homere
Assistant Examiner—Herng-der Day

(57) ABSTRACT

The invention comprises a method for processing seismic data to generate data related to the location of thin beds in the earth's subsurface. Seismic data windows are defined extending over selected portions of a group of spatially related seismic data traces. Frequency spectra of successively selected windows of the seismic data are generated by applying a transform having poles on the unit z-circle, where z is the z-transform, to the data windows; and the frequency spectra are utilized to generate data related to the location of thin beds in the earth's subsurface.

7 Claims, 7 Drawing Sheets

OTHER PUBLICATIONS

James D. Robertson and Henry H. Nogami;Stratigraphic Modeling and Interpretation-Geophysical Principles and Techniques; Thin Bed Stratigraphy from Complex Trace Attributes: AAPG Bulletin; May 1982; p. 624; vol. 66; No. 5.

Norman S. Neidell and Elio Poggiagliomi; Seismic Stratigraphy Applications To Hydrocarbon Exploration; AAPG Memoir 26; 1977; p. 389-416.

James D. Robertson and Henry H. Nogami; Complex seismic trace analysis of thin beds; Geophysics; Apr. 1989; p. 344-352; vol. 49; No. 4.

Andrew Marangakis, John K. Costain and Cahit Coruh; Use of integrated energy spectra for thin-layer recognition; Geophysics; Mar. 1985; p. 495-500; vol. 50; No. 3.

Ozdogan Yilmaz; Seismic Data Processing; Society of Exploration Geophysicists; 1987; Chapters 2.2 and 2.2.1; p. 85-94; Tulsa, Oklahoma.

* cited by examiner

PRIOR ART

SYSTEM FOR ESTIMATING THICKNESS OF THIN SUBSURFACE STRATA

BACKGROUND OF THE INVENTION

1. Field of the Invention

This invention is related to seismic data processing. More specifically, the invention is related to a system for processing seismic data to more clearly delineate thin beds in the earth's subsurface.

2. Description of Related Art

A seismic survey is an attempt to map the subsurface of the earth by sending sound energy down into the ground and recording the reflected energy that returns from reflecting interfaces between rock layers below. On land, the source of the down-going sound energy is typically seismic vibrators or explosives. In marine environments the source is typically air guns. During a seismic survey, the energy source is moved across the earth's surface and a seismic energy signal is generated at successive locations. Each time a seismic energy signal is generated, the reflected energy is recorded at a large number of locations on the surface of the earth. In a two dimensional (2-D) seismic survey, the recording locations are generally laid out along a straight line, whereas in three-dimensional (3-D) surveys, the recording locations are distributed across the earth's surface in a grid pattern.

The seismic energy recorded at each recording location is typically referred to as a "trace". The seismic energy recorded at a plurality of closely located recording locations will normally be combined to form a "stacked trace" and the term "traces" as used herein is intended to include stacked traces. Each trace comprises a recording of digital samples of the sound energy reflected back to the earth's surface from discontinuities in the subsurface where there is a change in acoustic impedance of the subsurface materials. The digital samples are typically acquired at time intervals between 0.001 seconds (1 millisecond) and 0.004 seconds (four milliseconds). The amount of seismic energy that is reflected from an interface depends on the acoustic impedance contrast between the rock stratum above the interface and the rock stratum below the interface. Acoustic impedance is the product of density, $\rho$, and velocity, $v$. The reflection coefficient, which is the ratio of amplitude of the reflected wave compared to the amplitude of the incident may be written:

$$\text{reflection coefficient} = (\rho_2 v_2 - \rho_1 v_1)/(\rho_2 v_2 + \rho_1 v_1) \quad \text{Eq. 1}$$

where,
$\rho_2$ = density of the lower layer
$\rho_1$ = density of the upper layer
$v_2$ = acoustic velocity of the lower layer, and
$v_1$ = acoustic velocity of the upper layers Reflected energy that is recorded at the surface can be represented conceptually as the convolution of the seismic wavelet which is transmitted into the earth from a seismic source with a subsurface reflectivity function. This convolutional model attempts to explain the seismic signal recorded at the surface as the mathematical convolution of the downgoing source wavelet with a reflectivity function that represents the reflection coefficients at the interfaces between different rock layers in the subsurface. In terms of equations:

$$x(t) = w(t) * e(t) + n(t) \quad \text{Eq. 2}$$

where,
$x(t)$ is the recorded seismogram
$w(t)$ is the seismic source wavelet
$e(t)$ is the earth's reflectivity function
$n(t)$ is random ambient noise, and
$*$ represents mathematical convolution.

Seismic data that have been properly acquired and processed can provide a wealth of information to the explorationist. However, the resolution of seismic data is not fine enough to depict "thin" beds with clarity. Seismic resolution may be defined as the minimum separation between two seismic reflecting interfaces that can be recognized as separate interfaces on a seismic record. Where a stratum (or layer) in the earth's subsurface is not sufficiently thick, the returning reflection from the top and the bottom of the layer overlap, thereby blurring the image of the subsurface.

Prior art techniques that have been utilized to improve resolution have included shortening the length of the seismic wavelet through signal processing techniques such as predictive deconvolution and source signature deconvolution. Although these processes have succeeded in shortening the seismic wavelets, the need remains for further improvements in the ability of seismic data to delineate thin beds. Other approaches are based generally on the observation that, even though there is only a single composite reflection and the thickness of the layer cannot be directly observed, there is still information to be found within the recorded seismic data that may be used indirectly to estimate the actual thickness of the lithologic unit.

By way of illustration, FIG. 1 shows a "pinch out" seismic model in which a wedge-shaped stratum gradually diminishes in thickness until it disappears at the left side of FIG. 1. FIG. 2 is a set of mathematically generated synthetic seismic traces that illustrate the convolution of a seismic wavelet with the upper and lower interfaces of this wedge shaped stratum. At the right side of FIG. 2, the seismic reflections from the upper boundary and the lower boundary of the wedge-shaped stratum are spatially separated enough so that the reflections do not overlap and the two interfaces are distinctly shown on the seismic trace. Moving to the left within FIGS. 1 and 2, the individual reflections from the upper and lower surfaces of the wedge-shaped stratum begin to merge into a single composite reflection and eventually disappear as the thickness of the wedge goes to zero. However, the composite reflection still continues to change in character after the reflections from the upper and lower surfaces merge into a single composite reflection. It has been disclosed in Widess, *How thin is a thin bed?*, Geophysics, December, 1973, vol. 38, p. 1176–1180, to use calibration curves which rely on the peak-to-trough amplitude of a composite reflected thin bed event, together with the peak-to-trough time separation, to provide an estimate of the approximate thickness of the thin layer. However, a necessary step in the calibration process is to establish a "tuning" amplitude for the thin bed event in question, which occurs at the layer thickness at which maximum constructive interference occurs between the reflections from the top and base of the unit. The success of this method is limited because of the need for careful seismic processing in order to establish the correct wavelet phase and to control the relative trace-to-trace seismic trace amplitudes.

A method is disclosed in U.S. Pat. No. 5,870,691 which utilizes the discrete Fast Fourier Transform to image and map the extent of thin beds and other lateral rock discontinuities in conventional 2-D and 3-D seismic data. The method is based on the observation that the reflection from a thin bed has a characteristic expression in the frequency domain that is indicative of the thickness of the bed. A homogeneous thin bed introduces a periodic sequence of notches into the amplitude spectrum of the composite reflection, which are spaced a distance apart that is inversely proportional to the temporal thickness of the thin bed. Accordingly, the thickness of the thin beds is determined by distance by which these notches are spaced apart.

A need continues to exist, however, for an improved method for extracting thin bed information from conventionally acquired seismic data.

It should be noted that the description of the invention which follows should not be construed as limiting the invention to the examples and preferred embodiments shown and described. Those skilled in the art to which this invention pertains will be able to devise variations of this invention within the scope of the appended claims.

SUMMARY OF THE INVENTION

The invention comprises a method for processing seismic data to generate data related to the location of thin beds in the earth's subsurface. Seismic data windows are defined extending over selected portions of a group of spatially related seismic data traces. Frequency spectra of successively selected windows of the seismic data are generated by applying a transform having poles on the unit z-circle, where z is the z-transform, to the data windows; and the frequency spectra are utilized to generate data related to the location of thin beds in the earth's subsurface.

DESCRIPTION OF THE PREFERRED EMBODIMENT

Figure 1:
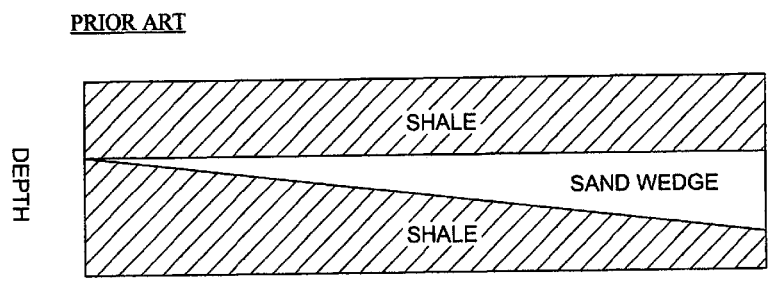
FIG. 1 shows a "pinch out" seismic model in which a wedge-shaped stratum gradually diminishes in thickness.
Figure 2:
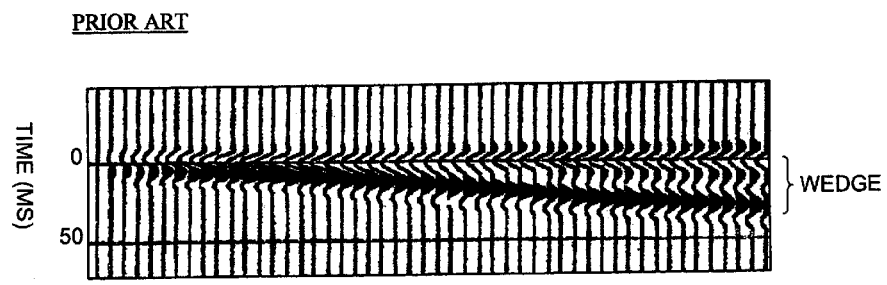
FIG. 2 shows a set of mathematically generated synthetic seismic traces that illustrate the convolution of a seismic wavelet with the upper and lower interfaces of the wedge-shaped model of FIG. 1.

The invention comprises a system for processing seismic data to detect the presence of thin beds. The data may be either two-dimensional (2-D) data gathered at a succession of data points along a line on the earth's surface, or the data may be three-dimensional (3-D) data gathered from seismic data points distributed, typically in a grid pattern, within an area of the earth's surface. A seismic signal that is transmitted into the earth for purposes of conducting a seismic survey will typically include substantial energy within a frequency range extending from as low as 5 Hz. up to at least 60 Hz. When this energy reaches a thin bed in the earth's subsurface, a portion of the incident energy will be reflected from the upper interface of the thin bed and from the lower interface of the bed. If the bed were thicker, the reflection from the upper interface and from the lower interface would appear separately in the resulting seismic data and it would be possible to determine the bed thickness with standard seismic data interpretation methods. For a thin bed, however, the signal reflections from the upper and lower interfaces will overlap. Depending on the frequency of the incident seismic energy and the travel time of the seismic energy from the upper to the lower interface, the apparent amplitude of the reflected seismic energy will be enhanced or diminished. Maximum enhancement will occur when the distance between the upper and lower interfaces is equal to a quarter wavelength of the incident seismic energy. Accordingly, it is an object of this invention to determine the frequency having the greatest amplitude in the frequency spectrum of the reflected seismic signal. Knowledge of this frequency, along with knowledge of the sonic velocity profile of the subsurface can be utilized to determine the presence of, and the thickness of, thin beds in the earth's subsurface. Frequently, a thin bed is a sand bed running through shale. Knowledge of the presence of sand beds and the bed thickness is very useful information because sand is a potential hydrocarbon reservoir.

In order to determine the power amplitude of frequencies in reflected seismic signals, the signals are converted from the time domain to the frequency domain. In order to perform this conversion a finite time window of a seismic data trace is selected. As discussed previously, the seismic signal recorded at the surface may be viewed as the mathematical convolution of the downgoing source wavelet with a reflectivity function that represents the reflection coefficients at the interfaces between different rock layers in the subsurface. If a long window is used, a lot of geology is averaged together, and for the purposes of the present invention, the window should preferably be short to minimize geologic averaging.

However, as the length of the time window of the data trace is decreased, the number of data samples within the window is decreased accordingly. When using the Fast Fourier Transform, according to the method of the prior art, for obtaining the amplitude of frequencies in reflected seismic signals, the number of unknowns is the entire spectrum, at discrete points, from zero frequency to the Nyquist frequency, which means that the number of unknowns is large. However, as the length of the data window is decreased, the number of data samples (that is, the number of equations) is decreased, and as the number of data samples is decreased, the frequency spectrum that is generated with the Fast Fourier Transform method is less precise and the results are seriously degraded.

The present invention, in which an estimate of the frequency spectrum of the seismic data is generated by use of a transform having poles on the unit z-circle, permits a shorter window to be utilized. In a preferred embodiment the transform utilized is the maximum entropy transform. The estimate of the frequency spectrum away from the peak frequency may be poor when a short time window is used, but it is an object of the invention to identify just one amplitude peak in the frequency spectrum, rather than to precisely estimate the entire spectrum. Further, the present invention provides greater accentuation of peaks in the spectral distribution than the Fast Fourier Transform method.

The maximum entropy method (MEM) equation for developing an approximation of the power spectrum, P(f), is as follows:

$$P(f) \approx \frac{a_0}{\left|1 + \sum_{k=1}^{M} a_k z^k\right|^2} \qquad \text{Eq. 3}$$

where:

$a_0$ and $a_k$ are the coefficients

M is the total number of samples in the data window k is the index for the summation, and z represents the Z transform.

Processes for computing the coefficients $a_0$ and $a_k$ are known to those of ordinary skill in the art. For example, one subroutine for computing these coefficients, listed in *Numerical Recipes in C*, Second Edition, by William H. Press et al., Cambridge University Press, Cambridge, England, 1992, on pages 568–569, is referred to therein as MEMCOF, and is incorporated herein by reference. However, other subroutines known to those of ordinary skill in the art may be used for this purpose. In the maximum entropy method, the coefficients which are determined in order to approximate the frequency spectrum are all in the denominator of the equation. Accordingly, the equation has poles, corresponding to infinite power spectral density, on the unit z-circle, i.e., at real frequencies in the Nyquist interval. Such poles can provide an accurate representation for underlying power spectra that have short, discrete "lines" or delta-functions. Having poles in the mathematical expression permits a peak in the frequency spectrum to be fitted more easily than with a Fast Fourier Transform, which includes only zeros in the mathematical expression and no poles. The Fast Fourier Transform method can have only zeros, not poles, at real frequencies in the Nyquist interval, and thereby generates an estimate of the spectrum for a uniformly distributed set of frequencies from zero frequency up to the Nyquist frequency, and must thus attempt to fit sharp spectral features with, essentially, a polynomial.

In a preferred embodiment of the invention the peak frequency (i.e., the frequency in the frequency spectrum having the greatest power amplitude) is determined for each window of the seismic data traces utilized in performing this invention. In one embodiment of the invention, the kurtosis, the fourth moment of the spectrum, is then be evaluated to determine how peaked the frequency distribution is for each data window. In one embodiment of the invention, only the data from those data windows for which the kurtosis exceeds a selected kurtosis value are utilized as output data.

In a particular implementation of the invention, either of three forms of output data may be selected. The first option (option one) is the amplitude of the spectrum at the peak frequency. The second option (option two) is the frequency at which the amplitude peak occurs, for example, 30 Hz. The third option (option three), provided a selected peakedness (i.e., kurtosis) threshold in the frequency spectrum is exceeded, is an estimate of the thickness of the thin bed.

The invention will normally be implemented in a digital computer. Computer instructions readable by a digital computer and defining the process of this invention will normally be stored on magnetic tape, a magnetic disk such as a CD-ROM, an optical disk, or an equivalent storage device and will instruct the computer to perform such process. A flow diagram for a program useful in implementing an embodiment of the invention is outlined in FIG. 3a. In a particular embodiment of the invention the following operational parameters may be used:

(a) the output data option (b) the number of poles in the spectral estimate (c) the half-width (in milliseconds) of the spectral-estimation window (d) the minimum frequency of input data (e) the maximum frequency of the input data (f) the frequency at which to begin the search for the peak frequency (g) velocity to use for the thickness estimation (in meters/second)

(h) cutoff kurtosis for thickness estimation.

The first relevant issue in specifying the number of poles to be used in the spectral estimate and the half width of the spectral-estimation window is that the spectral resolution in Hz. will be approximately the reciprocal of the window length in seconds, so that as the window length is increased, spectral resolution is improved. The second point is that if the number of poles is close to the number of seismic data samples in the window then spurious peaks will be exhibited, and the quality of the image will be decreased. The third point is that the number of poles should be limited to a few times the number of sharp spectral features that are to be fit. Since only one spectral feature (one peak frequency) is desired, the number of poles may preferably be limited to 1, 2, 3 or 4 poles, however, useful results may be obtained with more than 4 poles. Accordingly, the number of data samples which are required will be controlled by the number of poles utilized, and the number of data samples required will determine the window length required.

The input data set could theoretically have data from zero frequency up to the Nyquist frequency (a typical Nyquist frequency is around 250 Hz.). However, most seismic data sets do not have significant very low frequency energy, that is, energy at less than 5 or 10 Hz., and most seismic data sets do not have significant energy above 60 Hz. Therefore, the calculations can be speeded up by limiting the calculations to between a specified minimum frequency cut-off, such as 5 or 10 Hz., and a maximum frequency cut-off, such as 60 Hz. If the user has advance knowledge of the likely value of the peak frequency, the calculation process can be speeded up by specifying the frequency at which to begin the search for the peak frequency.

The velocity to be used for the thickness estimation is usually known from well logs from the area from which the data were recorded. If such well logs are not available, velocity values determined from other subsurface regions having similar lithologies may be utilized. Test results suggest that a normalized kurtosis value of 0.5 is appropriate. However, based on user experience, different values for the kurtosis cutoff may be 3 appropriate for different data sets.

Figure 3A:
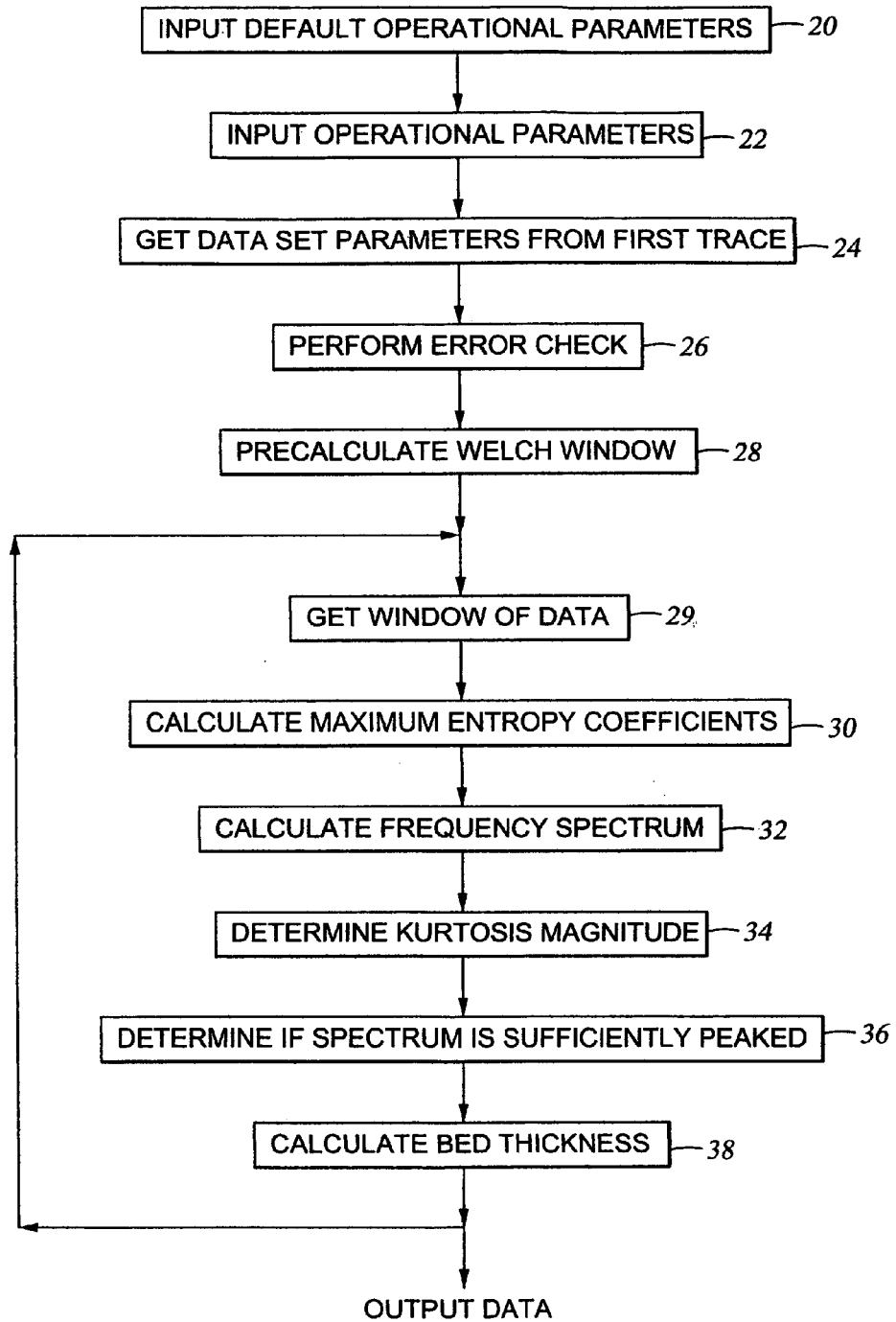
FIG. 3a shows a flow diagram for a program useful in implementing an embodiment of the invention.

Default operational parameters may be set up for the output data option, the number of poles in the spectral estimate, the half-width (in milliseconds) of the spectral-estimation window, the minimum frequency of input data, the maximum frequency of the input data, the velocity to use for the thickness estimation (in meters/second), and the cutoff kurtosis for thickness estimation. With reference to FIG. 3a these default values are inputted in step 20.

In step 22 operational parameters for the specific set of seismic data being processed are inputted, which may include the parameters listed as parameters (a)–(h), above.

In step 24, the program obtains the data set parameters from the first seismic trace. These parameters may include the length of the trace, the sample time interval, the in-line and cross-line dimensions of the data set, the shot number, the length of vibrator sweep, static correction data, the date and time of day and the field identification.

In a particular implementation of the invention error checking is performed in step 26 to determine that the input values from step 24 are reasonable. For example, the sample interval, which is the amount of time between samples in the seismic trace, obviously cannot be zero or less than zero.

Figure 4:
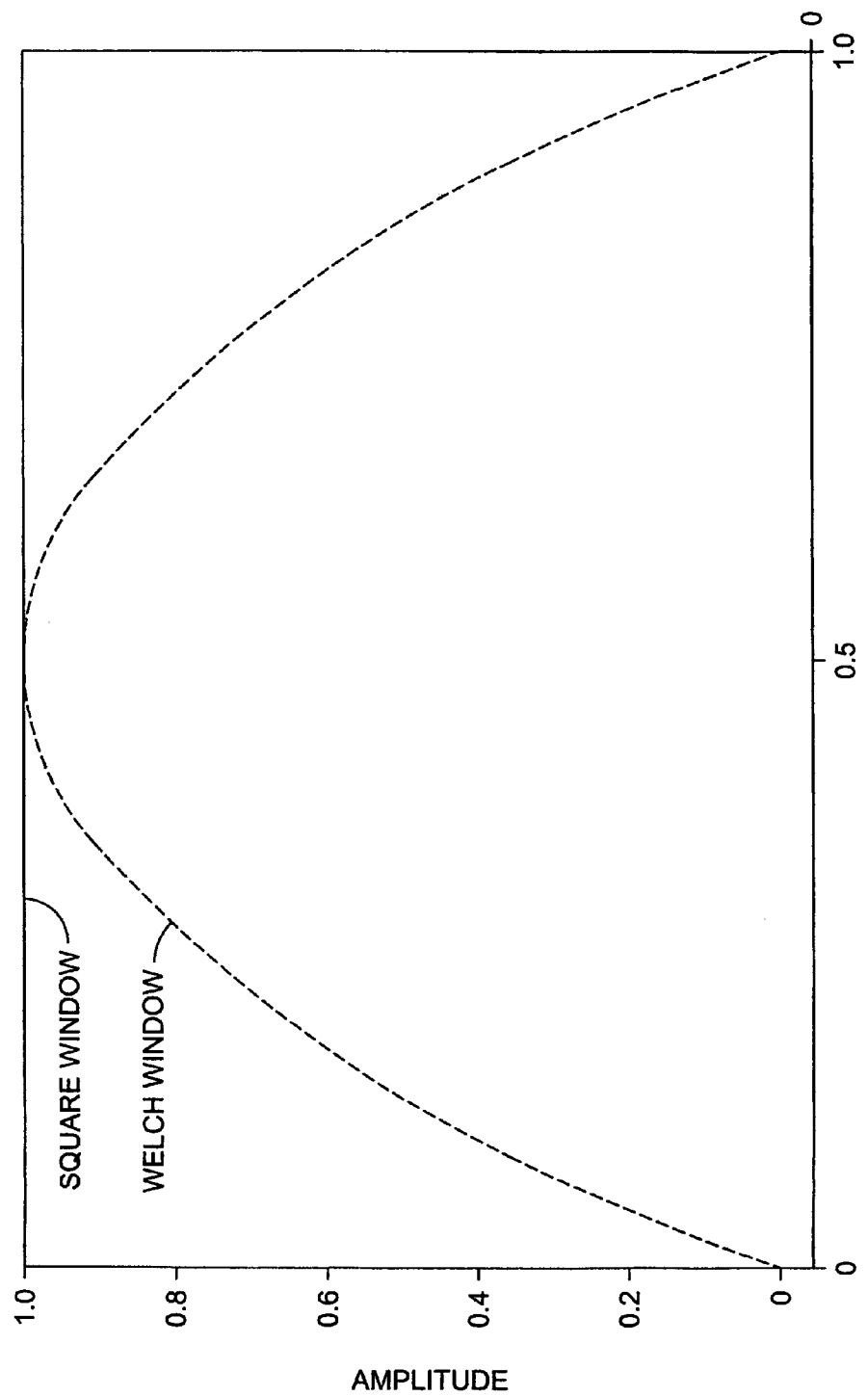
FIG. 4 shows the form of the Welch window.

The next step, step 28, is to precalculate a Welch window, which is applied to the window of seismic data before making the spectral estimate. Those of ordinary skill in the art will recognize from standard filter theory that the data in the selected window will need to be tapered, and precalculating a Welch window avoids the need to calculate the taper each time a trace is looped over. The form of the Welch window, which is well known to those of ordinary skill in the art is illustrated in FIG. 4. Those of ordinary skill in the art will recognize that other patterns for tapering the data, other than the Welch window pattern, may be utilized.

In step 29, the program initially obtains the first selected window of data from the first selected seismic trace. In a preferred embodiment, the program uses a first do loop to loop over the traces in the seismic data set and a second do loop to loop over successive data windows within each trace. Each time the program obtains the data from a selected window, it obtains the data samples within a time span of one-half the window length on each side of a selected center point. If the selected center point is from the beginning of the trace or the end of the trace, there may not be sufficient time span on either the upper or lower side of the center point for a full half-window, and if data for the full window is not available, then no spectral estimation is made. If there is enough time span on each side of the selected center point, the spectral estimate is performed. The window of data is copied into a work buffer, and it is verified that the data are not all zeros.

In step 30, the first step of the maximum entropy routine is then performed, which is the calculation of the maximum-entropy coefficients. The routine utilized for computing the coefficients is sent to the work buffer into which the window of data samples has been copied, along with the length of the window (WIN) and the number of poles (N) to use in the maximum entropy spectral estimate. The coefficients for the maximum entropy spectral estimate are then returned from this calculation.

After the coefficients are calculated, the coefficients are used in step 32 to calculate the frequency spectrum by processes which are well known to those of ordinary skill in the art. One routine for performing this computation is the EVLEM routine shown on page 575 of *Numerical Recipes in C*, Second Edition, by William H. Press et al., Cambridge University Press, Cambridge, England, 1992, which page is incorporated herein by reference. The spectrum is then evaluated to find the peak frequency in the spectrum and the amplitude of the peak frequency.

Once the peak frequency is determined, the program outputs either of three data items for the output depending on which option is selected. Option one is the amplitude of the spectrum at the peak frequency. Option two is to provide the peak frequency as an output. Option three is an estimate of the thickness of the thin bed.

If output option 3 has been selected, the kurtosis of the spectrum is calculated in step 34, and a determination is made in step 36 as to whether the kurtosis exceeds a preselected kurtosis value, and accordingly, indicates the presence of a thin bed.

If the spectrum is sufficiently peaked, and if the third output option is chosen, which is the option where the bed thickness is computed, then the thickness estimate is calculated in step 38 using the standard formula, known to those of ordinary skill in the art, for estimating a thickness at the tuning frequency. This formula is simply ¼ times the velocity divided by the frequency of the peak frequency (the tuning frequency).

The program will then loop over each successive window in the first selected seismic data trace and steps 29, 30, 32, 34, 36 and 38 of FIG. 3*a* are applied to the data samples within each selected window. After the second do loop has looped over each window of the first selected data trace, the first do loop will then loop over successive traces, and the second do loop will loop over each window in each successive traces in the same manner as for the first selected trace.

Figure 5:
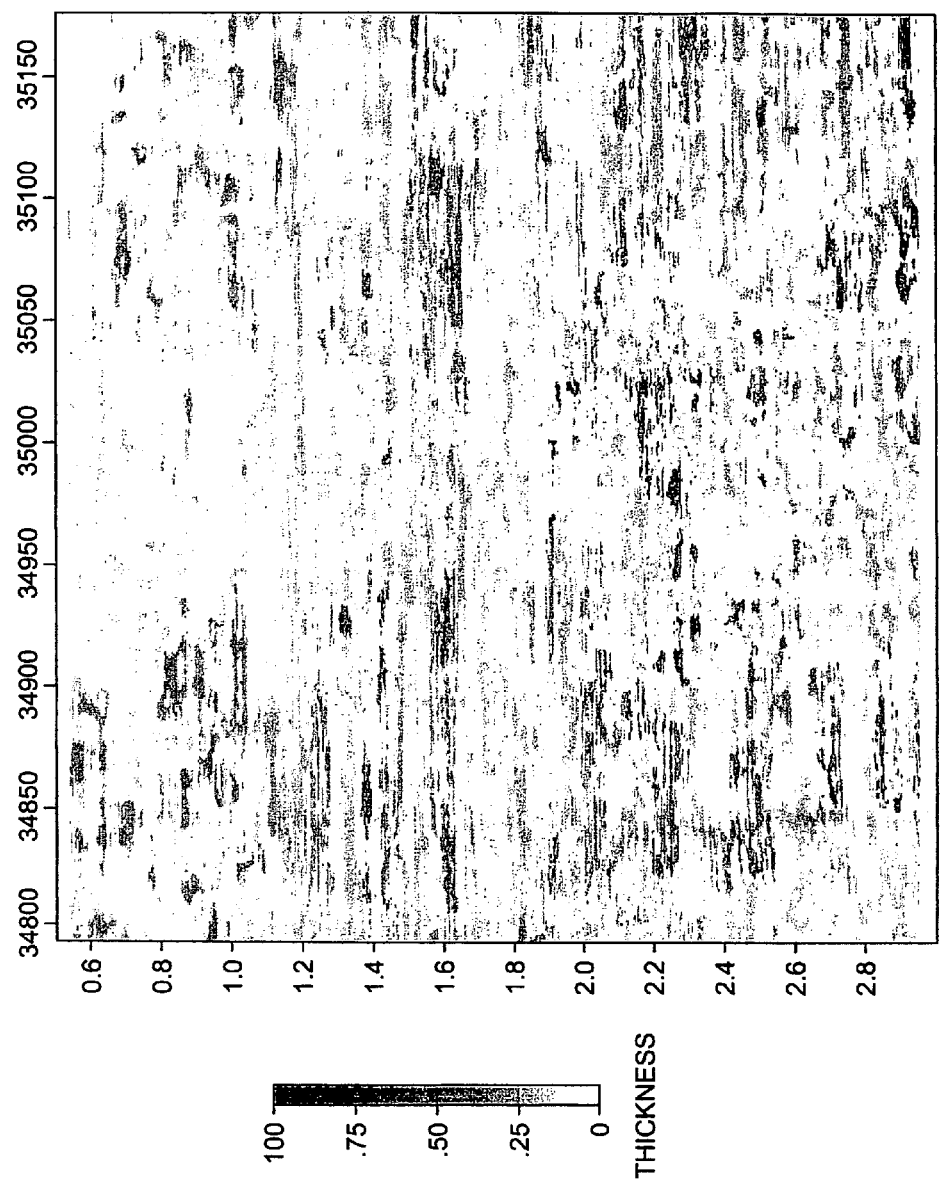
FIG. 5 shows a seismic display representing the results of an embodiment of the invention.

The flow diagram of FIG. 3*a*, and the foregoing discussion with reference to FIG. 3*a*, illustrate a particular embodiment of the invention in which kurtosis of the frequency spectra calculated in step 32 is determined, and the thickness of thin beds is calculated from the calculated frequency spectra which are sufficiently peaked. FIG. 5 shows the results of use of the invention using the option 3 output data. The results of the invention are displayed in the form of a seismic display, such as shown in FIG. 5, in which the horizontal dimension represents distance and the vertical dimension represents time, in seconds. A grey scale is utilized in FIG. 5, in which the darkness of the grey coloring represents the thickness of the bed which generated the frequency peak, and the position of the grey coloring represents the time or depth at which a frequency peak occurred. This thickness is equal to ¼ of the acoustic velocity of the identified subsurface layer divided by the frequency of the spectral peak. As stated previously, the acoustic velocity to be used for the thickness estimation is usually known from well logs from the area from which the data were recorded. If well log data are not available from the area, acoustic velocity from other regions of the subsurface having similar lithologies may be utilized.

Figure 3B:
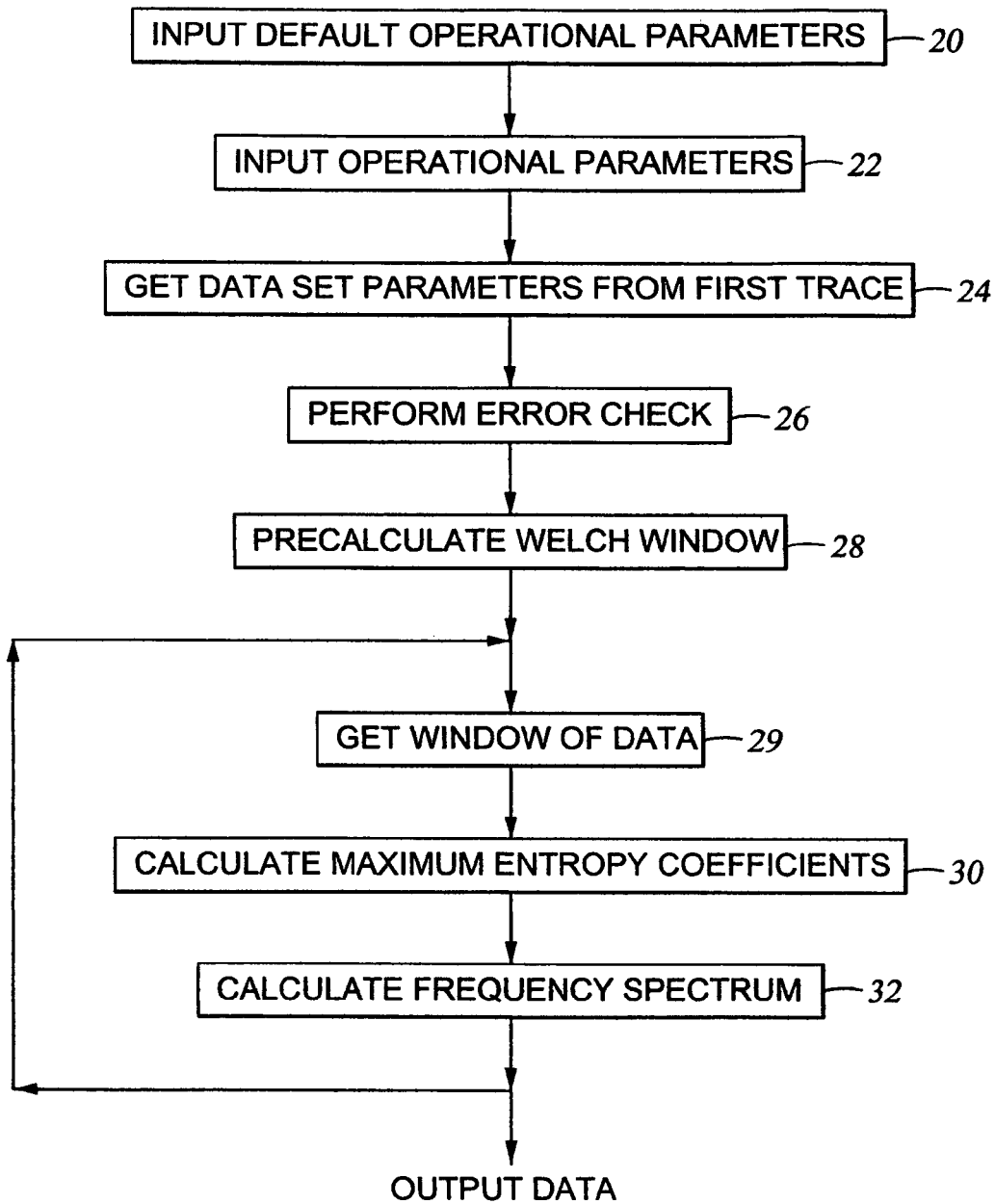
FIG. 3b shows a flow diagram for a program useful in implementing an embodiment of the invention.

It is also contemplated that the frequency spectra calculated in step 32 may be utilized to provide data regarding the presence of thin beds without performing steps 34, 36 and 38. The flow diagram of FIG. 3*b* illustrates this embodiment of the invention in which the output data may be in the form of either option 1 (the amplitude of the spectral peak) or option 2 (the frequency at which the amplitude peak occurs).

Output data, whether in the form of option 1, option 2 or option 3 are applied to a commercially available visualization software package to generate displays which may be viewed by an explorationist.

Figure 6C:
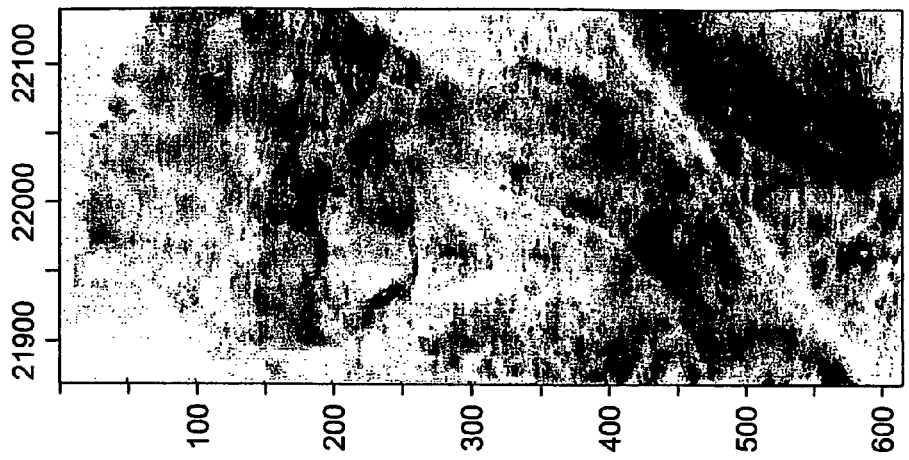
FIGS. 6a, 6b and 6c illustrate the results of an embodiment of the invention.
Figure 6B:
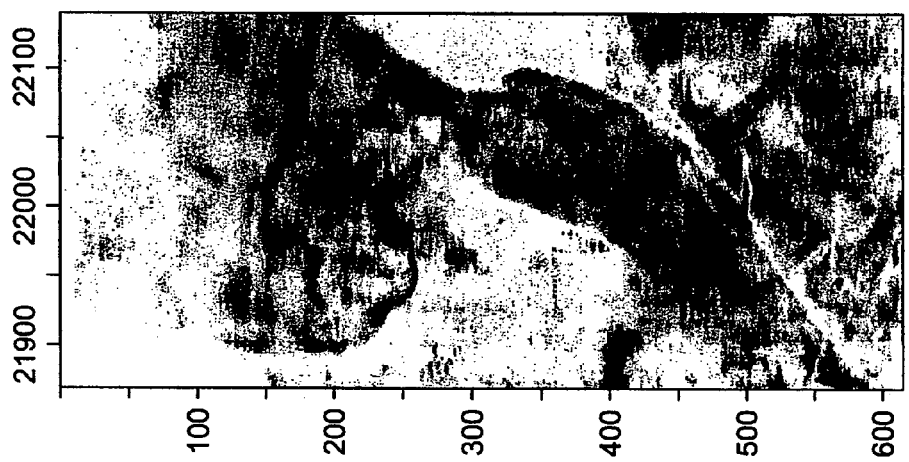
Figure 6A:
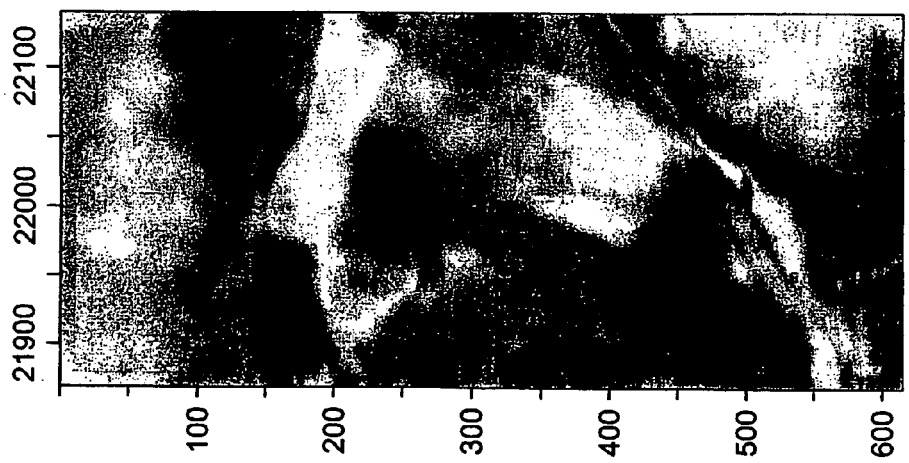

FIGS. 6*a*, 6*b* and 6*c* illustrate the application of an embodiment of the invention employing the option 1 output (the amplitude of the spectral peak). FIG. 6*a* shows a horizontal cross-section of the original seismic data from a 3-D data set from a region of the Gulf of Mexico. FIGS. 6*b* and 6*c* show spectral estimations of the seismic data shown in FIG. 6*a* generated by application of this invention using different parameter settings. The horizontal and vertical dimensions in FIGS. 6*a*, 6*b* and 6*c* represent distance, denoted on the Figures in terms of trace numbers. In FIG. 6*b*, the parameter settings included two poles and a half window length of 12 milliseconds. The data set was recorded at a 4 millisecond sample interval, so there will be three data samples in the 12 millisecond half window, and the total window length will be only 6 samples long. Although only two poles are used in the estimation shown in FIG. 6*b*, a clearly defined image is obtained of the sand feature. Near the bottom of FIGS. 6*a*, 6*b* and 6*c*, a channel (the dark region) can be seen extending toward the top right of each of these Figures. Moving upward in each of these Figures, a splay of this channel sand out into deeper water can be seen (the dark lobate feature). The feature shows up clearly in the spectral estimations (FIGS. 6*b* and 6*c*) and it is much easier to map the edges of this feature in the spectral estimations than it is in to map the feature using the original seismic data alone.

In FIG. 6c, for which a half window of 24 milliseconds and four poles were utilized, a slightly different image is obtained. Some features are common to the image obtained with four poles and with two poles, and some are different. For instance, in the image obtained with four poles (FIG. 6c), towards the top third of the picture, a thin channel can be seen traversing on top of the lobe. This channel is more difficult to see in the image for which only 2 poles and a half window of 12 milliseconds were utilized (FIG. 6b), and the channel is quite difficult to see in the original 3D data (FIG. 6a).

Tests have been conducted with varying numbers of poles and varying half window lengths. For data recorded at 4 millisecond intervals, it was observed that when a 100 millisecond half window length was utilized, the vertical resolution was poor, because a lot of geology was being averaged together. As the window length was decreased, the vertical resolution improved noticeably, which illustrates the principle that the smallest possible window length produces the best vertical resolution. Although vertical resolution of the spectral estimation data may not be equal to the resolution of the original seismic data, the spectral estimation data is responding to tuning in the seismic data, whereas the original seismic data do not. In locations where there are dark features in the spectral estimation data, tuning is going on. Tuning is the result of a bed thickness equal to one quarter of the wavelength of the seismic signal. Also, tuning is visible only when there is a very sharp velocity contrast between geologic layers, which typically occurs only when there is a sand channel running through shale. Knowledge of the bed thickness and an indication that the bed is a sand bed running through shale is very useful information. This is so because sand is a hydrocarbon reservoir, whereas shale is not.

It has also been observed that, for a constant window length, as the number of poles increases, there is point at which the quality of the spectral estimation diminishes. It has been observed that for a half window length of 100 milliseconds with a 4 millisecond sampling interval, a reasonable spectral display is obtained with up to 16 poles, but with 32 poles the data display becomes noisy. The reason for this noise is that the number of poles cannot exceed the number of data samples in the window length, and when the number of poles is close to the number of samples in the window, spurious peaks are exhibited. When 32 poles are utilized for a data window that included only 50 samples, the result was very noisy. Accordingly, as the window length is decreased, the number of poles that can be used also decreases.

Figure 7:
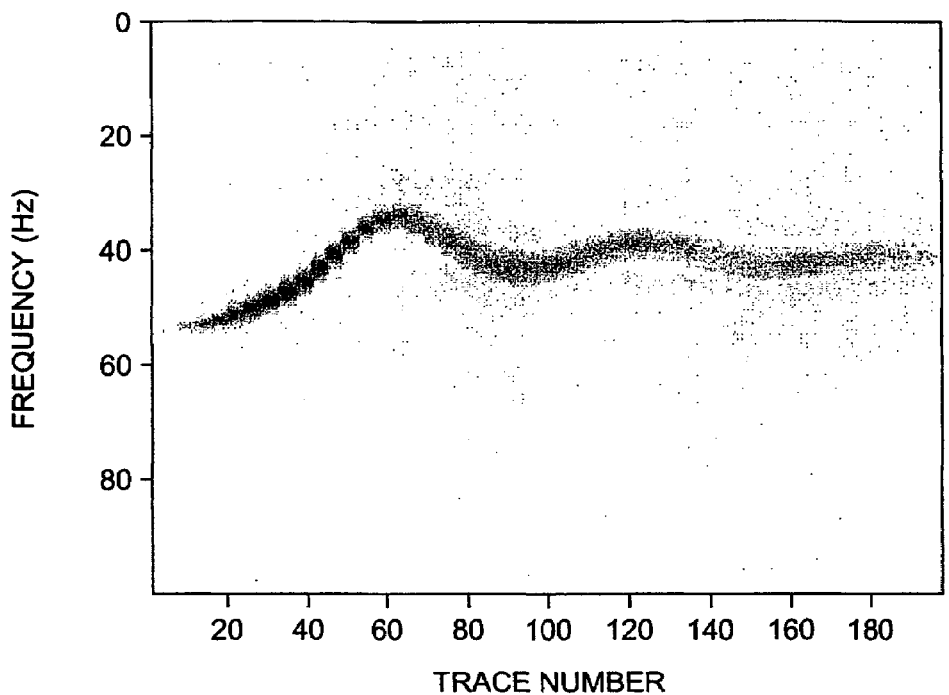
FIG. 7 shows a maximum entropy spectral estimate display of a wedge model.
Figure 8:
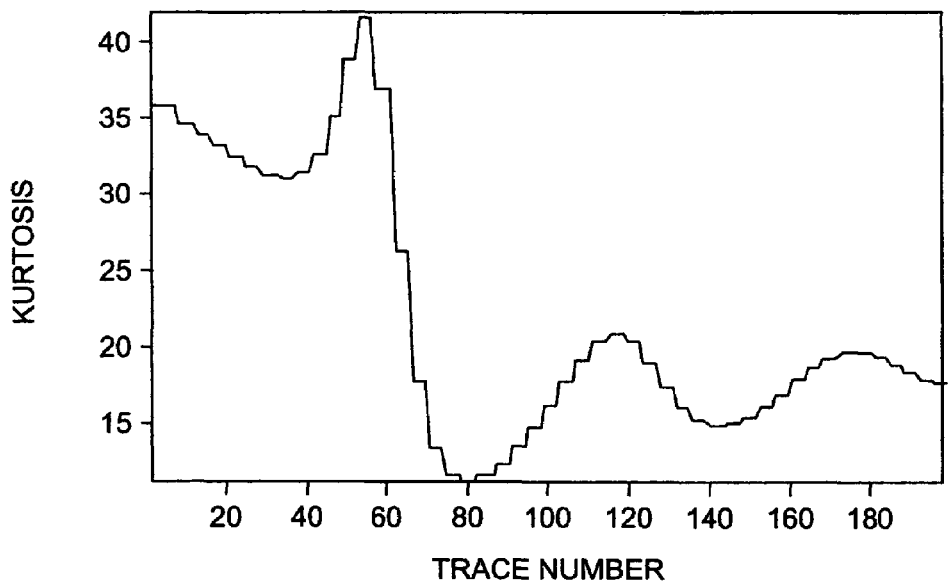
FIG. 8 shows the kurtosis calculated for the spectral estimate shown in FIG. 7.

The invention is further illustrated in FIG. 7, which shows a maximum entropy display of a wedge model, such as shown in FIG. 1, in which a wedge of sand is encased in shale. For this display, 2 poles and a half window of 12 milliseconds were utilized for obtaining the spectral estimation. Because few poles were used, the peak frequency is accentuated in each trace, and a single somewhat wavy line is developed for the spectral estimate. By using the kurtosis of the spectral estimate, the region where tuning is going on may be selected and the remainder of the line discarded. The kurtosis calculated for this spectral estimate is shown in FIG. 8. For the data traces where the kurtosis is high, the maximum entropy estimate is accepted and away from the kurtosis peak, the estimate is rejected. In FIG. 7, if only those traces for which the normalized kurtosis value is greater than 0.5 are accepted, the estimate would be accepted only for about the first 65 traces.

In the region of the wedge model where the wedge model is too wide for tuning to occur, a reflection of both the upper boundary and the lower boundary will appear independently in the seismic section, and the distance between the two boundaries can be determined by normal seismic interpretation. While the method of the present invention will provide an estimate of the thickness of a bed only in the region where the bed thickness is thin enough for tuning to occur, that is the only region in which the invention is really needed.

While the invention has been described and illustrated herein by reference to certain preferred embodiments in relation to the drawings attached hereto, various changes and further modifications, apart from those shown or suggested herein, may be made herein by those skilled in the art, without departing from the spirit of the invention, the scope of which is defined by the following claims.

I claim:

1. A computer implemented method of processing a group of spatially related seismic data traces, comprising:
   defining seismic data windows extending over selected portions of said group of spatially related seismic data traces;
   generating a frequency spectrum of the seismic data within each successively selected windows of said seismic data traces by applying a transform to said successively selected windows having poles on a unit z-circle, where z is the z-transform;
   determining the frequency having the greatest amplitude within the frequency spectrum of the seismic data within each said successively selected windows;
   calculating kurtosis of each said frequency spectrum;
   determining if the kurtosis of each said frequency spectrum exceeds a selected value of kurtosis;
   utilizing said determined frequencies having the greatest amplitude within each frequency spectrum having a kurtosis value which exceeds said selected value of kurtosis to generate a seismic display in which horizontal dimension represents distance and vertical dimension represents time, wherein the seismic display represents calculated bed thickness, and
   utilizing said seismic display to determine the presence of thin beds.

2. The method of claim 1 wherein said spatially related seismic data traces comprise a three dimensional volume of seismic data.

3. The method of claim 1 further comprising generating a substantially vertical cross-section of said seismic data to represent either the presence or absence of thin beds in said vertical cross-section.

4. The method of claim 1 wherein said transform is a maximum entropy transform.

5. The method of claim 4 wherein said transform has from one to four poles on the unit z-circle.

6. A computer implemented method of processing a group of spatially related seismic data traces, comprising:
   defining seismic data windows extending over selected portions of said group of spatially related seismic data traces;
   generating a frequency spectrum of the seismic data within each successively selected widows of said seismic data by applying a maximum entropy transform to said successively selected windows;
   determining a frequency component having the greatest amplitude within each said frequency spectrum;

calculating kurtosis of each said frequency spectrum;

determining if kurtosis of each said frequency spectrum exceeds a selected value of kurtosis; and utilizing said frequency components having the greatest amplitude within said frequency having a kurtosis value which exceeds said selected value of kurtosis to calculate bed thickness; and utilizing the calculated bed thickness to gen a seismic display in which the horizontal dimension represents distance and the vertical dimension represents frame, said seismic display representing either the presence or absence of thin beds.

7. The method of claim 6 wherein said seismic display comprises a substantially vertical cross-section of a three-dimensional volume of seismic data.

\* \* \* \* \*